T. Welch,
Pitman.
No. 2,857. Reissued Feb. 4, 1868.
Fig: I
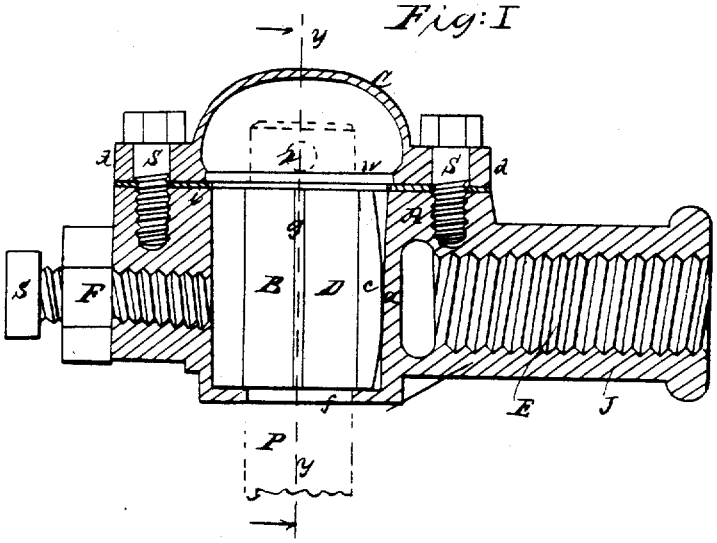
Fig: 2.
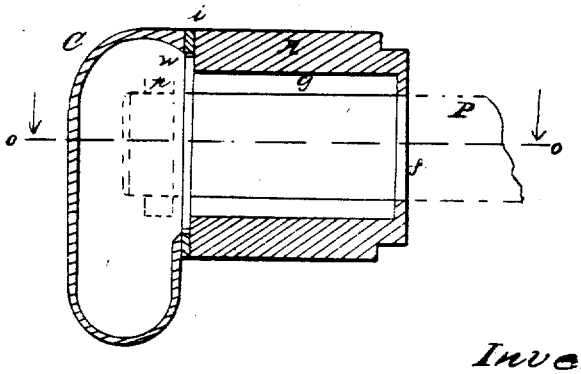
Witnesses:
Wm. J. Loughborough
Aug. H. Billings
Inventor:
Thomas Welch.
N. PETERS, PHOTO-LITHOGRAPHER, WASHINGTON, D. C.

UNITED STATES PATENT OFFICE.

THOMAS WELCH, OF CHURCHVILLE, NEW YORK.

IMPROVEMENT IN CRANK-PIN BOXES.

Specification forming part of Letters Patent No. 49,185, dated August 1, 1865; Reissue No. 2,857, dated February 4, 1868.

*To all whom it may concern:*

Be it known that I, THOMAS WELCH, of Churchville, in the county of Monroe and State of New York, have invented certain new and useful Improvements in Crank-Pin Boxes for Reapers and Mowers; and I do hereby declare that the following is a full, clear, and exact description thereof, reference being had to the accompanying drawings, making part of this specification, in which—

Figure 1 is a section of my in[illegible]ion, taken in the plane of the red line *o* i[illegible]g. 2, showing the lower half of the stock A and the top of the boxes B and D′. Fig. 2 is [illegible] vertical section of the same, as indicated [illegible] the red line *y* in Fig. 1.

Like letters indicate corresponding parts in both figures.

The half of the box D opposite the set-screw *s* has a convex face, and, resting against a similar face in the stock or head of the connecting-rod, the boxes are permitted to adjust themselves to the position of the crank-pin without cramping.

To enable others to make and use my invention, I will describe its construction and operation.

The head or stock A of the crank or connecting rod is cored at E and tapped out, as seen in Fig. 1, to receive the end of said rod. The opening to receive the journal-boxes B and D may be cast round or polygonal, if desired. The side opposite the set-screw *s*, as seen at *a*, is made convex to allow the box to adjust itself to the crank-pin, even when the lower end of the rod may be thrown from its ordinary position, which is frequently the case, by raising or lowering or otherwise changing the cutter-bar. The side of the box D is also made more or less convex, as seen at *c*, Fig. 1. The set-screw *s* is provided to tighten the boxes when they shall have been worn.

There may be a thin washer of rubber or of leather between the jam-nut F and the head A to prevent the nut from jarring loose.

The inclosing-cap *c* is cast as shown in the drawings, and is provided with a projecting lug or ear, *d*, on each side, for the clamping-screws S to pass through. This cap may also be packed with leather *i*, or other suitable material, between it and the head A. This head or stock A and boxes B and D are slipped onto the crank-pin, which is indicated by the dotted lines P, where they are held by the washer *w* and pin *p*, as shown by dotted lines. The reservoir or cap *c* is then partially filled with oil or other lubricating substance and attached by the screws *s* to the stock A. At each revolution of the crank the oil is dashed up against the end of the pin, and, more or less falling into the space *g* between the boxes, a portion of it will find its way to the other end of the pin, but is prevented from escaping by the flange *f* and the socket of the crank-wheel, as shown in my former application for improved box and pin. The end of the connecting-rod is screwed into the shank J of the head A, and may be lengthened or shortened by screwing the head farther off or on before applying it to the crank-pin.

What I claim as my invention, and desire to secure by Letters Patent, is—

1. In combination with the adjustable boxes B D, a pitman, P, so united therewith that it will freely move and work, for the purposes set forth.

2. In combination with the adjustable boxes and pitman *a*, set-screw *s*, for the purposes set forth.

3. The combination of the cap C with the boxes B D, pitman P, and set-screw *s*, for the purposes set forth.

THOMAS WELCH.

Witnesses:

C. M. ALEXANDER,

J. M. MASON.